United States Patent Office 3,661,988
Patented May 9, 1972

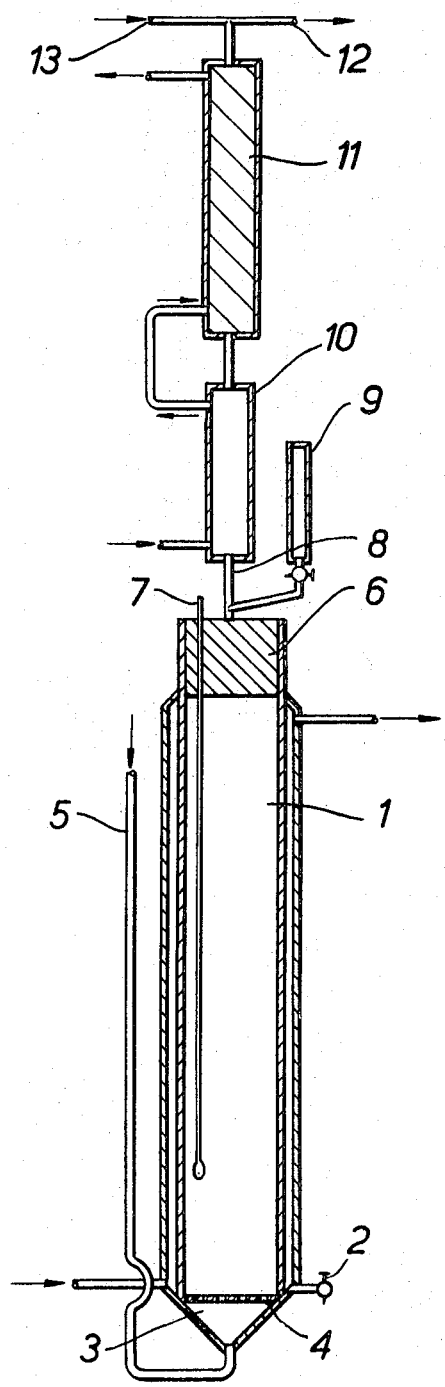

3,661,988
PROCESS FOR THE PREPARATION OF
ACETIC ACID
Jacques Boichard, Bernard Brossard, Michel Gay, and Raymond Janin, Rhone, France, assignors to Rhone-Poulenc S.A., Paris, France
Filed June 24, 1968, Ser. No. 739,456
Claims priority, application France, June 28, 1967, 112,277; Sept. 14, 1967, 121,024
Int. Cl. C07c 53/08
U.S. Cl. 260—533 R
5 Claims

ABSTRACT OF THE DISCLOSURE

Acetic acid is prepared by oxidising propylene with nitric acid in the presence of a vanadium catalyst.

The present invention relates to the preparation of acetic acid from propylene.

Acetic acid can be prepared industrially from various organic compounds. The process which is most used consists in oxidising acetaldehyde continuously with oxygen or air, under pressure and in the presence of catalysts, such as manganese acetate (see Kirk-Othmer's Encyclopedia of Chemical Technology, 5, pp. 393–394, second edition).

It has now been found, and it is this which forms the subject of the present invention, that acetic acid can be prepared in excellent yields from propylene by a process which comprises passing propylene into aqueous nitric acid containing a vanadium compound as catalyst.

It is known from German Pat. No. 742,053 that the passage of propylene into nitric acid at 70° C. leads to the formation of oxalic acid, and it is therefore unexpected that the addition of a vanadium catalyst would cause the reaction to produce acetic acid.

The temperature of the reaction can be between 20 and 100° C., preferably between 40 and 80° C., and kept constant throughout the entire process. Alternatively the propylene may be passed into the nitric acid solution of the catalyst at a predetermined temperature, and the temperature of the medium then raised to a higher value. Although it is unnecessary to use high pressures to obtain good yields, it is possible to work under pressures, e.g. up to 20 bars.

The concentration of the nitric acid used can vary within wide limits. Concentrations between 20 and 90% by weight are generally quite suitable. During the reaction, it is possible, depending on the concentration of the nitric acid used, to allow the concentration of the nitric acid in the medium to fall to 20%, or to maintain the concentration at about the initial value, by adding either fresh nitric acid or nitric acid resulting from the oxidation of the nitrous vapours produced during the reaction.

The vanadium compound used as catalyst is preferably soluble at least in part in the nitric acid. The degree of oxidation of the vanadium in the catalyst is not critical. Suitable compounds are vanadium pentoxide ($V_2O_5$); vanadium halides, such as $VF_5$; vanadium oxyhalides, such as $VOF_3$; $VOBr_3$ and $VOCl_3$; vanadic sulphate ($V_2O_5 \cdot 2SO_3$); vanadic nitrate or phosphate; alkali metal orthovanadates [e.g. $Na_3VO_4$; $K_3VO_4$; and $(NH_4)_3VO_4$]; alkali metal metavanadates (e.g. $LiVO_3$; $NaVO_3$; and $NH_4VO_3$); and alkali metal hoxavanadates, such as $Na_2O \cdot 3V_2O_5 \cdot 3H_2O$.

The vanadium compound acts catalytically and the propylene/vanadium ratio has no influence on the rate of the reaction. However, the concentration of vanadium in the oxidising medium determines the direction of the reaction. Whereas in practice only oxalic acid is obtained in the absence of vanadium, the orientation of the oxidation towards the production of acetic acid is strongly pronounced, with concentrations of vanadium as small as $2 \times 10^{-4}\%$ by weight, the yields of acetic acid and oxalic acid being in the region of 30% and 48% respectively. For a concentration of vanadium in the oxidising medium of about $45 \times 10^{-4}\%$, the yield of acetic acid is 90% and the formation of oxalic acid is practically nil. It is not generally advantageous to use a catalyst concentration greater than about 5% (calculated as vanadium).

The quantity of propylene is not critical. It depends on various conditions of the process: equipment, temperature, and the concentration of nitric acid used. Generally, it is chosen in such a way as to obtain a conversion which is as complete as possible of the propylene in the reaction medium.

During the oxidation of the propylene, nitrous vapours are formed, which can be reoxidised to nitric acid, either in the actual oxidising medium of the propylene (it is then suitable to cause a stream of oxygen or of a gas containing oxygen, such as air, to pass into the reaction medium), or in an external oxidation zone.

Taking into account the reactants used and the working conditions, the process of the invention can be carried out continuously.

The following examples illustrate the invention.

EXAMPLE 1

The equipment used, which is shown in the accompanying drawing, comprises the following elements: a cylindrical glass reactor 1 with a height of 350 mm., a diameter of 50 mm. and an effective volume of 450 cc., equipped with a double jacket and a withdrawal cock 2 at its base, a conical chamber 3 connected to the lower part of the reactor and closed at the level of the connection of the latter by a plate 4 consisting of fritted glass No. 3 (pores with an average diameter between 15 and 40μ), a supply tube 5 for propylene, and optionally another gas, starting from the apex of the conical chamber and adapted to be connected to a source of propylene or other gas; a reactor head formed by a ground-in stopper 6 equipped with a thermometer tube 7 and a pipe 8 connected on the one hand to a dropping funnel 9 and on the other hand to a straight reflux condenser 10, above which is arranged a coil-type condenser 11, both condensers being supplied with a stream of ice-cold water and being adapted to condense part of the nitrous vapours coming from the reactor. Water at a temperature of 50° C. circulates in the double jacket of the reactor so as to keep the reaction mixture at the desired temperature. The effluent gases are carried away through the pipe 12 and, after meeting a stream of oxygen supplied by the pipe 13, are carried to an arrangement, not shown in the figure, comprising a column in which scrubbing is effected by counter-current contact with water, two absorbers containing 110 volume hydrogen peroxide to absorb the remainder of the nitrous vapours, and a gas chromatography apparatus for measurement of the untransformed propylene and other gases leaving the reaction.

Before starting the reaction, a slight propylene pressure is established on the fritted glass plate to avoid any entry of liquid into the chamber 3, and 271.3 g. of a solution obtained from 2.7 g. of sodium metavanadate, 244.9 g. of 94.3 nitric acid, and 70 g. of water, this solution thus containing 3.16 mols of $HNO_3$, are then introduced.

The propylene is introduced at a constant rate of about 1.2 litres per hour, measured under normal temperature and pressure conditions. The temperature of the reaction medium is 53° C. By the dropping funnel, 94.3% nitric acid is added to compensate partially for the drop in concentration of the nitric acid in the reaction medium.

The stream of propylene is maintained for 5 hours, during which period 30 g. of 94.3% nitric acid are added.

Altogether, 11.4 g. of propylene, i.e. 0.271 mol, are used. During this period no propylene is noted in the effluent gases. A stream of nitrogen is caused to pass into the apparatus to drive off the gases present, and the reaction mass is then maintained for 15 hours as 52–53° C., the nitrous vapours being entrained in the reoxidation apparatus by a stream of oxygen at 2 litres per hour, supplied through the pipe 13.

The reaction mass withdrawn weighs 271.9 g. The concentration of $HNO_3$ is 60.5%. An aliquot portion of this mass is steam distilled. In the aqueous distillate containing the organic acids which have formed, it is established that there is no formic acid (by measurement with mercuric chloride). The acetic acid which has formed, measured by potentiometric determination of the organic acidity, represents a yield of 94% based on the propylene used.

EXAMPLE 2

Operating as in Example 1, with the different variables having the values given in the following table, the results set out in the table are obtained.

We claim:

1. Process for the preparation of acetic acid which comprises passing propylene into aqueous nitric acid of concentration between 20 and 90% by weight in the presence, as catalyst, of a vanadium compound which provides vanadium ions in the reaction mixture, the temperature of the reaction mixture being kept at between 20 and 100° C.

2. Process according to claim 1, in which the concentration of the said catalyst in the reaction mixture is at least $2 \times 10^{-4}\%$ by weight (calculated as vanadium).

3. Process according to claim 1 in which the temperature is between 40 and 80° C.

4. Process according to claim 1 in which the catalyst is $NaVO_3$ or $VOSO_4$.

5. Process according to claim 1 in which the propylene is passed into 20 to 90% by weight aqueous nitric acid at 20° to 100° C. containing from $2 \times 10^{-4}$ to 5% by weight (calculated as vanadium) of $NaVO_3$ or $VOSO_4$ as catalyst.

TABLE

| | A | B | C | D | E | F | G | H |
|---|---|---|---|---|---|---|---|---|
| Oxidising solution initially supplied: | | | | | | | | |
| Total weight in g | 271.4 | 560.2 | 566.6 | 537.6 | 535.2 | 270 | 541.9 | 270 |
| $\frac{HNO_3}{HNO_3+H_2O}$ percent by weight | 73.2 | 73.5 | 73.9 | 74.8 | 74.5 | 73.5 | 74 | 30.5 |
| Catalyst: | | | | | | | | |
| Nature | $NaVO_3$ | $NaVO_3$ | $NaVO_3$ | $NaVO_3$ | $NaVO_3$ | $VOSO_4$ | $NaVO_3$ | $NaVO_3$ |
| Vanadium concentration, p.p.m.[1] | 240 | 135 | 45 | 10 | 2.2 | 3,000 | 135 | 2,700 |
| Propylene: | | | | | | | | |
| Mols used | 0.288 | 0.904 | 0.898 | 0.772 | 0.779 | 0.248 | 0.573 | 0.324 |
| Transformation rate, percent | 99 | 97.5 | 99 | 100 | 100 | 100 | 98 | 42 |
| $HNO_3$ added (during the passage of the propylene): | | | | | | | | |
| Concentration, percent | 93.6 | 93.6 | 94.8 | 95.6 | 95.6 | 95.4 | 95.6 | |
| Weight in g | 31 | 185.9 | 185.7 | 182.3 | 180.9 | 31.5 | 110.1 | |
| Passage of the propylene: | | | | | | | | |
| Temperature at which the reaction mixture is maintained in ° C | 52 | 50 | 50 | 50 | 50 | 53 | 30 | 51 |
| Time, hours (minutes) | 5 | 8 (30) | 8 | 7 | 7 | 5 (15) | 5 (15) | 6 |
| After stopping the propylene: | | | | | | | | |
| Temperature at which the reaction mixture is maintained, in ° C | 50 | 50 | 50 | 50 | 50 | 50 | 45 | 50 |
| Time, hours (minutes) | 15 | 15 | 15 | 15 | 15 | 15 | 1 (30) | 15 |
| Reaction mixture withdrawn: | | | | | | | | |
| Total weight in g | 269 | 620.4 | 643.8 | 587 | 571 | 265.8 | 577.3 | 260.2 |
| $\frac{HNO_3}{Total\ weight}$ percent by weight | 60.5 | 59.6 | 58.3 | 59.6 | 55.6 | 59.9 | 59.4 | 26.2 |
| Acetic acid, molar yield in percent related to the transformed propylene | 88.5 | 93 | 87.5 | 66 | 30 | 85 | 95 | 60 |
| Oxalic acid, molar yield in percent related to the transformed propylene | | | | 12 | 48 | | | |

[1] Parts per million.

References Cited

UNITED STATES PATENTS

| | | | |
|---|---|---|---|
| 2,847,465 | 8/1958 | Robertson et al. | 260—533 |
| 3,400,160 | 9/1968 | Masaki et al. | 260—533 |
| 3,407,221 | 10/1968 | Lutz | 260—533 |

LORRAINE A. WEINBERGER, Primary Examiner

R. D. KELLY, Assistant Examiner